(12) United States Patent
Shiraki

(10) Patent No.: US 9,450,892 B2
(45) Date of Patent: Sep. 20, 2016

(54) SWITCH DEVICE, NETWORK SYSTEM, AND SWITCH DEVICE CONTROL METHOD

(71) Applicant: FUJITSU LIMITED, Kawasaki-shi, Kanagawa (JP)

(72) Inventor: Osamu Shiraki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/616,771

(22) Filed: Feb. 9, 2015

(65) Prior Publication Data

US 2015/0256458 A1    Sep. 10, 2015

(30) Foreign Application Priority Data

Mar. 5, 2014    (JP) .................................. 2014-043342

(51) Int. Cl.
H04L 12/28    (2006.01)
H04L 12/935    (2013.01)
H04L 12/931    (2013.01)

(52) U.S. Cl.
CPC ......... H04L 49/3009 (2013.01); H04L 49/357 (2013.01)

(58) Field of Classification Search
CPC ........................ H04L 49/3009; H04L 49/357
See application file for complete search history.

(56) References Cited

U.S. PATENT DOCUMENTS

| | | | | |
|---|---|---|---|---|
| 8,948,176 B1* | 2/2015 | Desanti | .................. | H04L 45/44 370/351 |
| 8,953,606 B1* | 2/2015 | McGlaughlin | ................ | 370/229 |
| 2003/0037163 A1* | 2/2003 | Kitada | ................ | H04L 12/4645 709/236 |
| 2007/0097968 A1* | 5/2007 | Du | ...................... | H04L 12/4666 370/389 |
| 2009/0262740 A1* | 10/2009 | Miyoshi | ................ | G06F 15/177 370/392 |
| 2012/0177042 A1* | 7/2012 | Berman | .............. | H04L 12/4625 370/392 |
| 2012/0177043 A1* | 7/2012 | Berman | .............. | H04L 12/4625 370/392 |
| 2012/0263038 A1 | 10/2012 | Kobayashi et al. | | |
| 2013/0094513 A1* | 4/2013 | Shiraki | ............... | H04L 49/3009 370/395.53 |
| 2013/0148663 A1* | 6/2013 | Xiong | .................. | H04L 45/745 370/392 |
| 2013/0223450 A1* | 8/2013 | Kamiya | .................... | H04L 1/18 370/392 |
| 2013/0243006 A1* | 9/2013 | Otsuka | ................ | H04L 12/4604 370/401 |
| 2013/0315065 A1* | 11/2013 | Matsuike | ................ | H04L 47/33 370/236 |
| 2013/0322460 A1* | 12/2013 | Decusatis | ............... | H04L 45/24 370/419 |
| 2014/0286175 A1* | 9/2014 | Shiraki | .................. | H04L 45/74 370/241 |
| 2014/0362854 A1* | 12/2014 | Addanki | ............... | H04L 12/185 370/390 |
| 2015/0236950 A1* | 8/2015 | DeCusatis | ............... | H04L 45/24 370/392 |
| 2015/0333928 A1* | 11/2015 | Shiraki | ............... | H04L 12/4641 370/254 |

FOREIGN PATENT DOCUMENTS

JP    2012-227651    11/2012
JP    2013-85166    5/2013

* cited by examiner

Primary Examiner — Clemence Han
(74) Attorney, Agent, or Firm — Fujitsu Patent Center

(57) ABSTRACT

A switch device includes: a first relay circuit deciding a transmission port to which the frame of the first communication is output, when the received frame is the first communication; a processor deciding a transmission port corresponding to a destination address of the received frame, and generating a second relay table including information for identifying the transmission port corresponding to the destination address of the received frame; and a second relay circuit deciding a transmission port to which the frame of the second communication is output, as the transmission port to which the frame of the second communication is output, a transmission port corresponding to the destination address of the received frame among the plurality of ports on the basis of the content of the second relay table, when the port that has received the frame of the second communication is an end port.

9 Claims, 25 Drawing Sheets

MESH STRUCTURE
TRILL (Transparence Interconnection of Lots of Links)
SPB (Shortest Path Bridging)

| VLAN ID | Destination Address | Destination port | |
|---|---|---|---|
| 1 | 00:12:34:56:78:aa | 1 | 456 |
| 1 | 00:12:34:56:78:bb | 2 | |
| 2 | 00:12:34:56:78:cc | 5 | |
| : | : | : | |

F I G. 1 0

| Type | Source port | Destination Address | Destination port |
|---|---|---|---|
| FIP | 1 | * | 19 |
| FCOE | 1 | * | 19 |
| FCOE | * | 00:12:34:56:78:dd | 20 |
| : | : | : | : |

458

F I G. 1 1

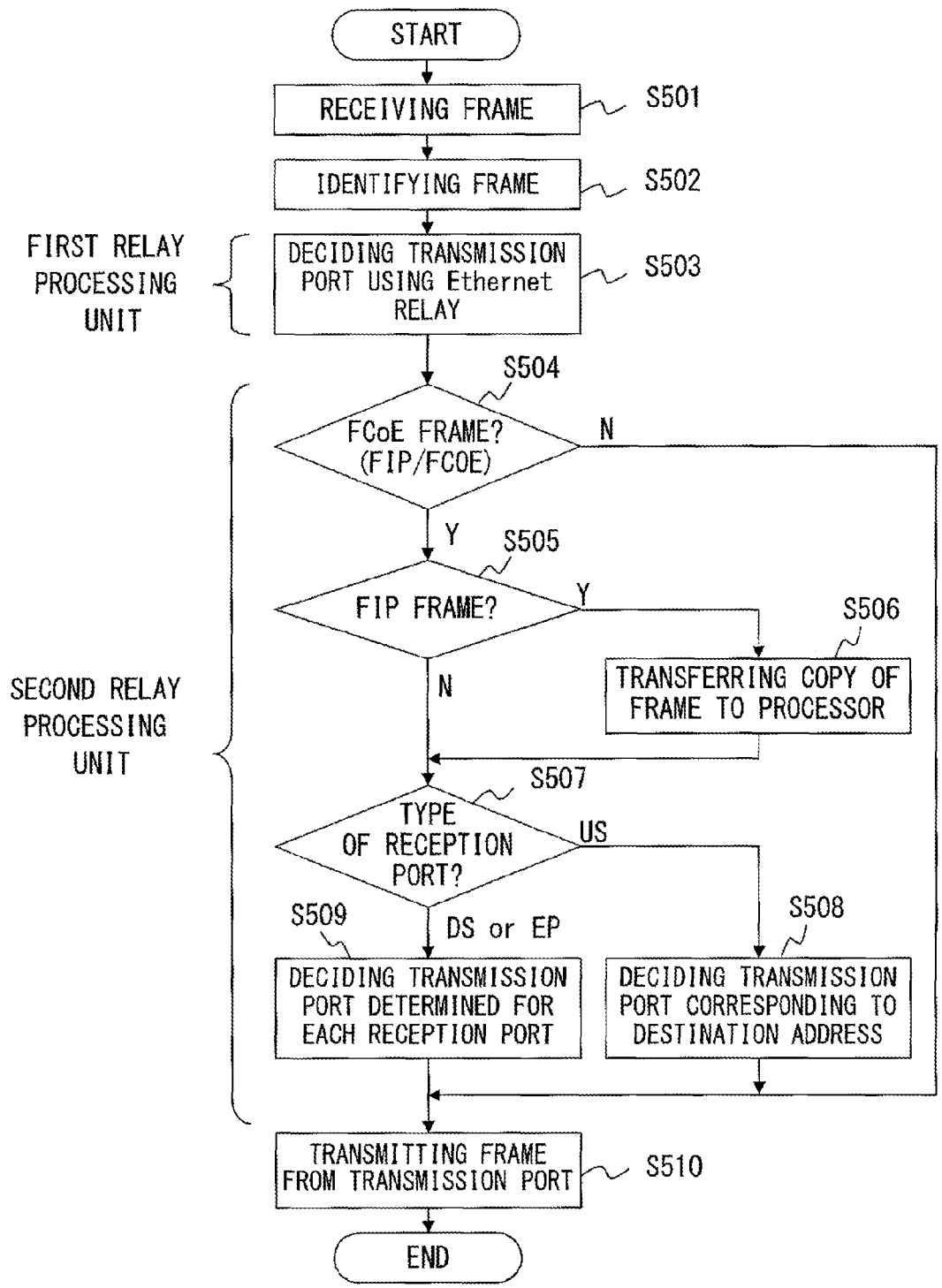
F I G. 1 2

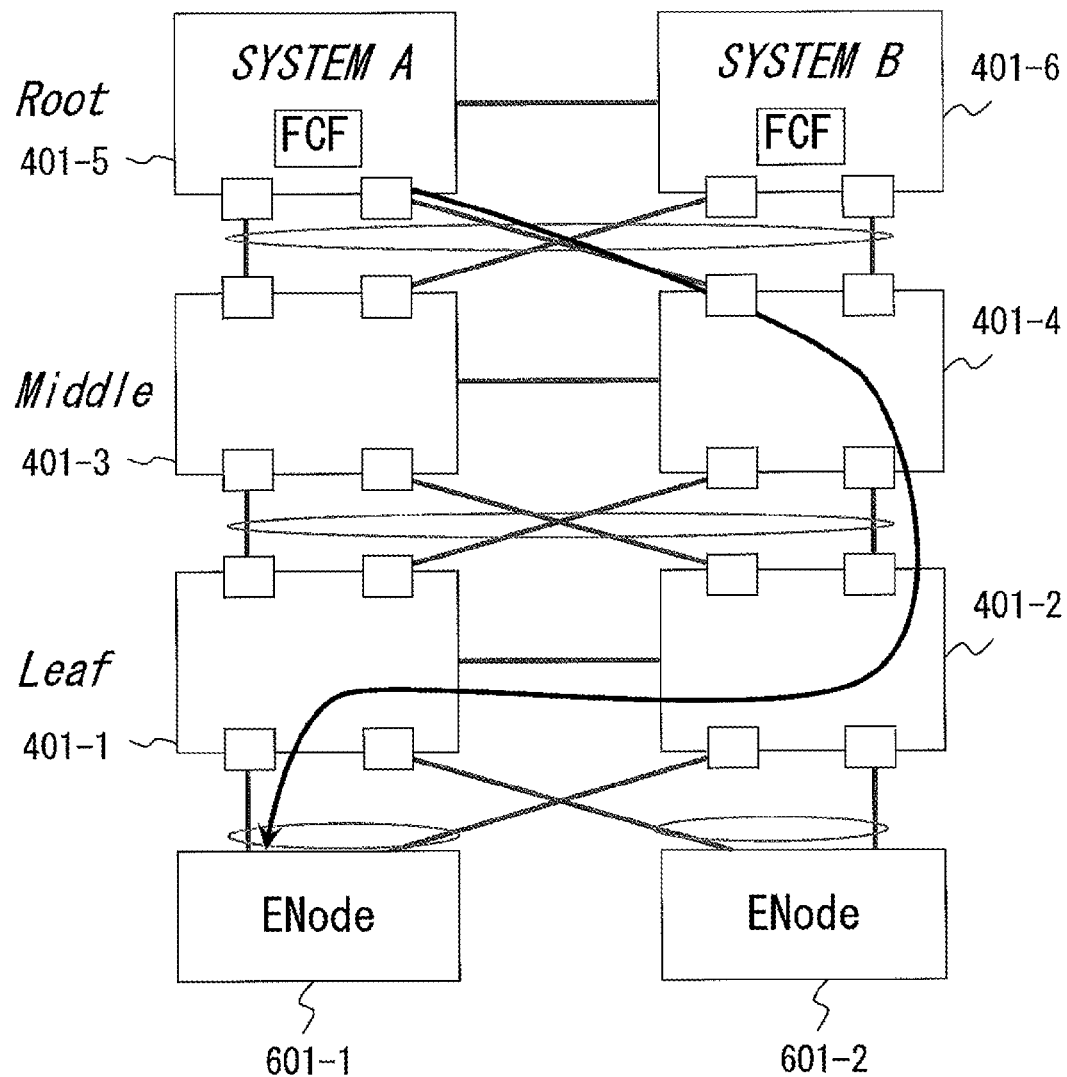
F I G. 1 8

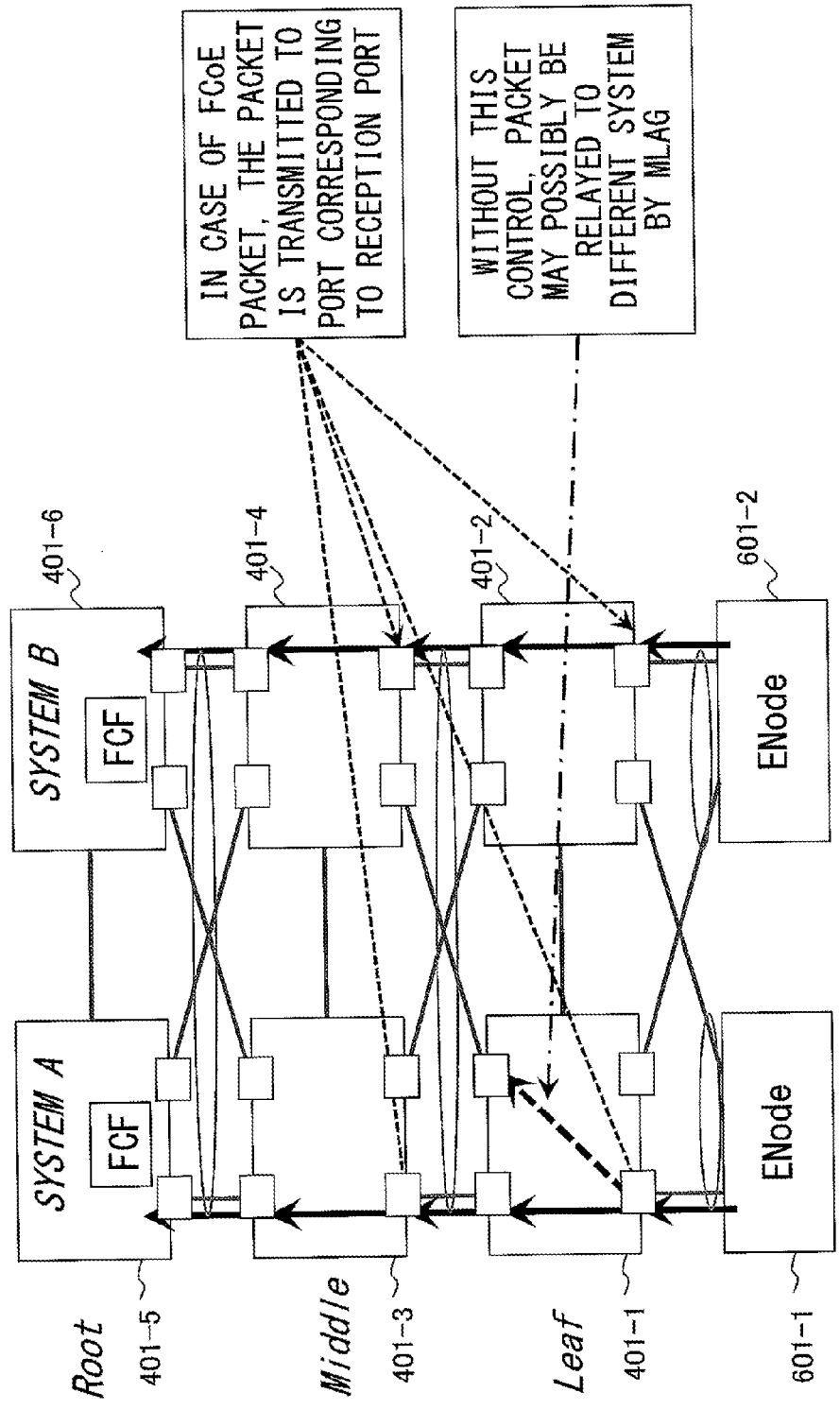

■ LOWEST-ORDER BIT OF FIRST OCTET IN MAC ADDRESS IS 1
■ ESPECIALLY, IN CASE OF IP MULTICASTING, HIGHER-ORDER 3 OCTETS ARE SET TO 01-00-5E, AND LOWEST-ORDER 23 BITS ARE ASSIGNED TO MULTICAST GROUP
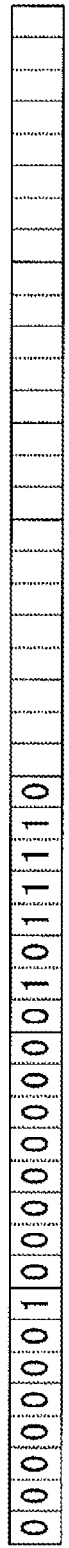
Multicast group
F I G. 2 2

SWITCH DEVICE, NETWORK SYSTEM, AND SWITCH DEVICE CONTROL METHOD

CROSS-REFERENCE TO RELATED APPLICATION

This application is based upon and claims the benefit of priority of the prior Japanese Patent Application No. 2014-043342, filed on Mar. 5, 2014, the entire contents of which are incorporated herein by reference.

FIELD

The embodiments discussed herein are related to a switch device, a network system, and a switch device control method.

BACKGROUND

Conventionally, a communication from a server to a storage device (hereinafter referred to as a "storage communication") demanded a higher communication performance than that of a communication between servers (hereinafter referred to as an "inter-server communication"). Therefore, separate networks were organized (FIG. 1). Here, an inter-server communication network is called a Local Area Network (LAN), whereas a storage communication network is called a Storage Area Network (SAN). Moreover, a server and a Fibre Channel (FC) switch, and a storage device and an FC switch are respectively connected by an FC, so that communication paths are multiplexed to improve Reliability Availability Serviceability (RAS) (fabric multiplexing).

With the recent speed-up of Ethernet, it has become possible to implement an integrated network where an inter-server communication and a storage communication are integrated. Techniques for handling a packet of an FC, which is a standard of a SAN, with Ethernet include Fibre Channel over Ethernet (FCoE).

At the initial stage of a LAN/SAN integrated network using FCoE, a connection between an End Node (a server or a storage) and an FCoE switch was implemented as a 1-hop connection (FIG. 2). Moreover, an End Node (a server or a storage) and an FCoE switch are connected by FCoE, so that communication paths are made redundant to improve RAS (redundant fabric).

Additionally, a connection between an End Node and an FCoE switch is implemented as a multi-hop connection in the current LAN/SAN integrated network (FIG. 3).

Ethernet is described next.

A network topology of Ethernet conventionally had a tree structure.

Currently, the network topology of Ethernet has been expanded to a topology having a plurality of path options as illustrated in FIGS. 4 and 5. In such topologies, techniques such as Multi-chassis Link Aggregation (MLAG), Transparent Interconnection of Lots of Links (TRILL), and Shortest Path Bridging (SPB), and the like are used.

With the FCoE multi-hop connection, a network is shared although links of end nodes are made redundant (FIG. 6). Accordingly, this poses a problem in that influence is exerted on a plurality of storage network systems when a fault occurs.

Furthermore, documents such as Japanese Laid-open Patent Publication No. 2013-85166, Japanese Laid-open Patent Publication No. 2012-227651, and the like are well-known.

SUMMARY

According to an aspect of the embodiments, a switch device includes a plurality of ports, a determination circuit, a processor, a first relay circuit, and a second relay circuit.

The determination circuit determines whether a received frame is either a frame of a first communication or a frame of a second communication.

The first relay circuit decides a transmission port, to which the frame of the first communication is output, among the plurality of ports on the basis of content of a first relay table when the determination circuit determines that the received frame is the frame of the first communication.

The processor decides a transmission port corresponding to a destination address of the received frame among the plurality of ports, and generates a second relay table including information for identifying the transmission port corresponding to the destination address of the received frame.

The second relay circuit decides a transmission port, to which the frame of the second communication is output, on the basis of content of the second relay table, or the second relay circuit decides, as the transmission port to which the frame of the second communication is output, a transmission port corresponding to the destination address of the received frame among the plurality of ports on the basis of the content of the second relay table, when the port that has received the frame of the second communication is an end port or a downstream port in a case where the received frame is the frame of the second communication.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 10 illustrates an example of a first relay table.

FIG. 11 illustrates an example of a second relay table.

FIG. 12 is a flowchart illustrating a process of a switch LSI according to the embodiment.

FIG. 18 illustrates a flow of an Ethernet packet.

FIG. 19 illustrates a flow of an FCoE packet from an end node to an FCF.

FIG. 22 illustrates a multicast address.

DESCRIPTION OF EMBODIMENTS

Embodiments are described below with reference to the drawings.

Figure 7:
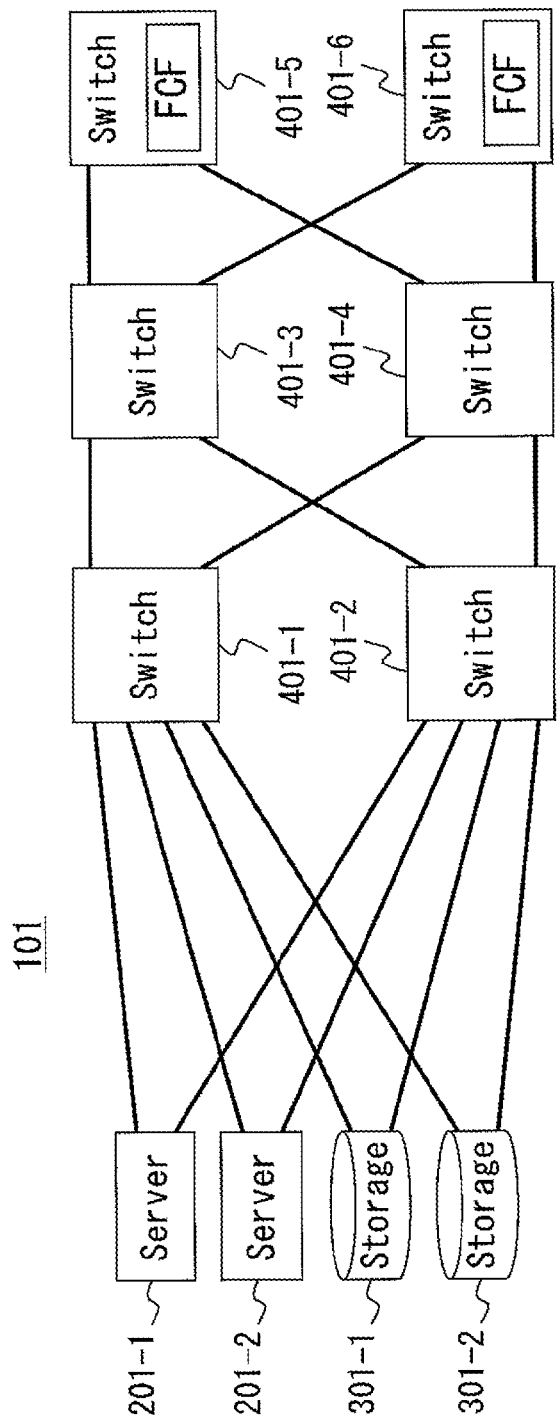
FIG. 7 illustrates a configuration of a system according to an embodiment.

FIG. 7 illustrates a configuration of a system according to an embodiment.

The system 101 includes servers 201-i (i=1, 2), storage devices 301-i (i=1, 2), and switch devices 401-j (j=1 to 6).

Each of the servers 201 is an information processing device that writes data to the storage device 301 and reads data from the storage device 301. The servers 201-1, 201-2 are connected to the switch devices 401-1, 401-2.

Each of the storage devices 301 is a device that stores data. Each of the storage devices 301 writes and reads data in response to a request from the server 201.

Each of the storage devices 301 is, for example, a hard disk drive, a magnetic tape device, or the like. The storage devices 301-1, 301-2 are connected to the switch devices 401-1, 401-2.

Each of the switch devices 401 is a device that identifies a type of a frame (packet) and performs routing for a frame.

The switch devices 401-1, 401-2 are connected to the servers 201-1, 201-2, the storage devices 301-1, 301-2, and the switch devices 401-3, 401-4.

The switch devices 401-3, 401-4 are connected to the switch devices 401-1, 401-2, 401-5, 401-6.

The switch devices 401-5, 401-6 are connected to the switch devices 401-3, 401-4. Moreover, the switch devices 401-5, 401-6 are FCoE Forwarders (FCFs).

Figure 8:
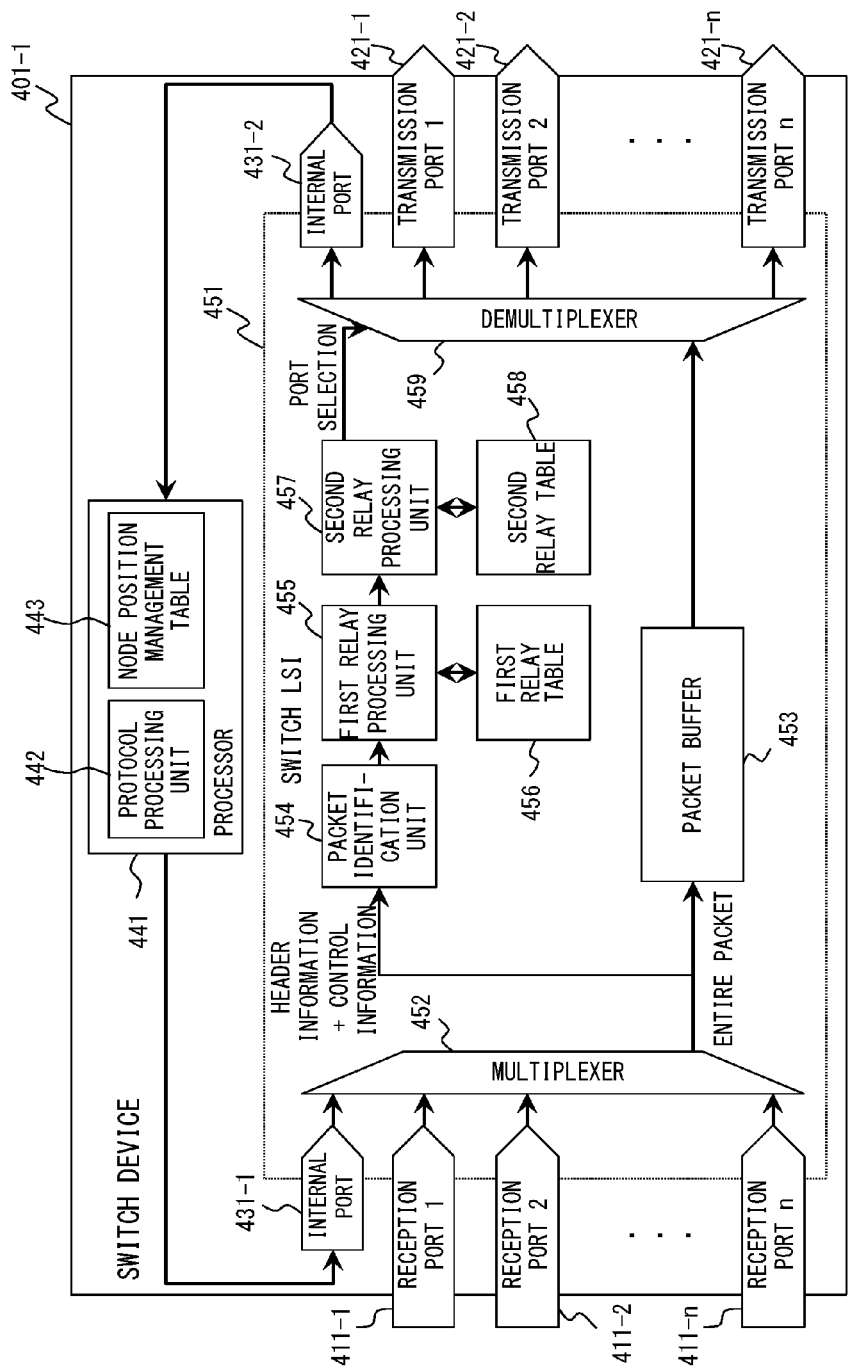
FIG. 8 illustrates a configuration of a switch device according to the embodiment.

FIG. 8 illustrates a configuration of a switch device according to the embodiment.

Since configurations of the switch devices 401-1 to 401-6 are identical, only a configuration of the switch device 401-1 is described here.

The switch device 401-1 includes reception ports 411-k (k=1 to n), transmission ports 421-k, internal ports 431-1 and 431-2, a processor 441, and a switch Large Scale Integration (LSI) 451.

Each of the reception ports 411 is a port that receives a frame.

Each of the transmission ports 421 is a port that transmits a frame.

Additionally, the reception port 411-k and the transmission port 421-k make a port pair, and the same port number is assigned to the reception port 411-k and the transmission port 421-k.

The internal port 431-1 transfers output of the processor 441 to a multiplexer 452.

The internal port 431-2 transfers output of a demultiplexer 459 to the processor 441.

The processor 441 includes a protocol processing unit 442, and a node position management table 443.

The protocol processing unit 442 makes settings of the node position management table 443, a first relay table 456, and a second relay table 458.

The node position management table 443 is a table in which address information (Media Access Control (MAC) address) and a port number are associated with each other and stored.

The node position management table 443 is stored in a storage unit such as a register or the like within the processor 441. Details of the node position management table 443 will be described later.

The switch LSI 451 includes the multiplexer 452, a packet buffer 453, a packet identification unit 454, a first relay processing unit 455, a first relay table 456, a second relay processing unit 457, a second relay table 458, and the demultiplexer 459. The switch LSI 451 is, for example, a semiconductor circuit.

The multiplexer 452 outputs a received frame to the packet buffer 453. The multiplexer 452 also outputs a header and control information of the received frame to the packet identification unit 454.

The packet buffer 453 is a buffer that stores a received frame.

The packet identification unit 454 identifies a type of the received frame. A header and control information of the received frame are input to the packet identification unit 454. The control information includes, for example, a port number indicating the reception port 411 that has received the frame, destination information of FCoE, and the like.

The first relay processing unit 455 decides a transmission port 421 to which a frame is output, on the basis of the first relay table 456 when the received frame is an Ethernet frame. The first relay processing unit 455 outputs, to the demultiplexer 459 via the second relay processing unit 457, a control signal indicating that the frame is to be output to the decided transmission port 421.

The first relay table 456 is a table used to decide a transmission port 421 to which a frame is output. Details of the first relay table 456 will be described later.

The second relay processing unit 457 decides a transmission port 421 to which a frame is output, on the basis of the second relay table 458 when the received frame is an FCoE frame. The second relay processing unit 457 outputs, to the demultiplexer 459, a control signal indicating that the frame is to be output to the decided transmission port 421.

The second relay table 458 is a table used to decide a transmission port 421 to which a frame is output. Details of the second relay table 458 will be described later.

The demultiplexer 459 outputs, to the transmission port 421 and the internal port 431-2, the frame input from the packet buffer 453 on the basis of the control signal from the first relay processing unit 455 or the second relay processing unit 457. The control signal indicates the port to which the frame is to be output.

Figure 9:
FIG. 9 illustrates an example of a node position management table.

FIG. 9 illustrates an example of a node position management table.

In the node position management table 443, an FCF MAC address, an ENode MAC address, and a port number are associated with one another and written.

The FCF MAC address is a MAC address of an FCF (the switch device 401-5 or 401-6).

The ENode MAC address is a MAC address of an end node (the server 201 or the storage device 301).

The port number is a number (identifier) which is assigned to a port for identifying the port.

FIG. 10 illustrates an example of a first relay table.

In the first relay table 456, a VLAN ID, Destination Address, and Destination port are associated with one another and written The VLAN ID is an identifier of a virtual LAN.

The Destination Address is a MAC address of a device at a destination.

The Destination port is a port number of the transmission port 421.

FIG. 11 illustrates an example of the second relay table 458.

In the second relay table 458, Type, Source port, Destination Address, and Destination port are associated with one another and written.

The Type is a type of a frame. The Type is, for, example, FIP or FCoE.

The Source port is a port number of the reception port 411.

The Destination Address is a MAC address of a device at a destination. The MAC address described here is a Fabric Provided MAC Address used in FCoE.

The Destination port is a port number of the transmission port 421.

Note that a wild card (*) indicating an arbitrary value maybe used as a value written in the second relay table 458.

FIG. 12 is a flowchart illustrating a process of the switch LSI according to the embodiment.

In step S501, the reception port 411 receives a frame. The received frame is stored in the packet buffer 453. Moreover, a header and control information of the received frame are input to the packet identification unit 454.

In step S502, the packet identification unit 454 identifies a type of the frame (Ethernet or FCoE) on the basis of the header of the received frame.

When the frame is an Ethernet frame, step S503 is executed. Alternatively, when the frame is an FCoE frame or an FCoE Initialization Protocol (FIP) frame, steps S504 to S509 are executed. Then, step S510 is executed after step S503 or S509.

In step S503, the first relay processing unit 455 references the first relay table 456 to decide the transmission port 421 to which the frame is output. Specifically, the first relay processing unit 455 searches the first relay table 456 by using a VLAN ID and a destination address of the header as a search key, finds a Destination port corresponding to the VLAN ID and the destination address, and decides upon the found Destination port as the port to which the frame is output. The first relay processing unit 455 outputs a control signal for selecting the decided Destination port to the demultiplexer 459 via the second relay processing unit 457.

In step S504, the second relay processing unit 457 determines whether the received frame is an FCoE frame. When the received frame is an FCoE frame, a control proceeds to step S505. Alternatively, when the received frame is not an FCoE frame, the control proceeds to step S510. Here, the second relay processing unit 457 determines that the received frame is an FCoE frame when the type of the received frame is FIP or FCoE.

In step S505, the second relay processing unit 457 determines whether the received frame is an FIP frame. When the received frame is an FIP frame, the control proceeds to step S506. Alternatively, when the received frame is not an FIP frame, the control proceeds to step S507.

In step S506, the second relay processing unit 457 outputs, to the demultiplexer 459, a control signal for selecting the internal port 431-2. The demultiplexer 459 outputs the frame from the packet buffer 453 to the internal port 431-2. The internal port 431-2 outputs the frame to the processor 441. Namely, a copy of the received frame is transferred to the processor 441.

In step S507, the second relay processing unit 457 determines a type (EP, DS, or US) of the reception port 411 that has received the frame. Note that the type of the reception port 411 is predetermined, and information of the type of the reception port 411 is stored within the switch device 401-1. A method for deciding a type of a port will be described later.

When the type of the reception port 411 is an upstream port (US), the control proceeds to step S508. Alternatively, when the type of the reception port 411 is a downstream port (DS) or a port (End Point: EP) connected to an end node, the control proceeds to step S509.

In step S508, the second relay processing unit 457 references the second relay table 458 to decide the transmission port 421 to which the frame is output. Specifically, the second relay processing unit 457 searches the second relay table 458 by using a destination address of the frame as a search key, finds a Destination port corresponding to the destination address, and decides upon the found Destination port as the port to which the frame is output. The second relay processing unit 457 outputs, to the demultiplexer 459, a control signal for selecting the decided Destination port. Note that the destination address used here is a Fabric Provided MAC Address.

In step S509, the second relay processing unit 457 references the second relay table 458 to decide the transmission port 421 to which the frame is output. Specifically, the second relay processing unit 457 searches the second relay table 458 by using the port number of the reception port 411 that has received the frame as a search key, finds a Destination port corresponding to the port number, and decides upon the found Destination port as the port to which the frame is output. The second relay processing unit 457 outputs, to the demultiplexer 459, a control signal for selecting the decided Destination port.

In step S510, the demultiplexer 459 selects the transmission port 421 on the basis of the control signal, and outputs the frame from the packet buffer 453 to the selected transmission port 421. The selected transmission port 421 outputs the frame.

Figure 13:
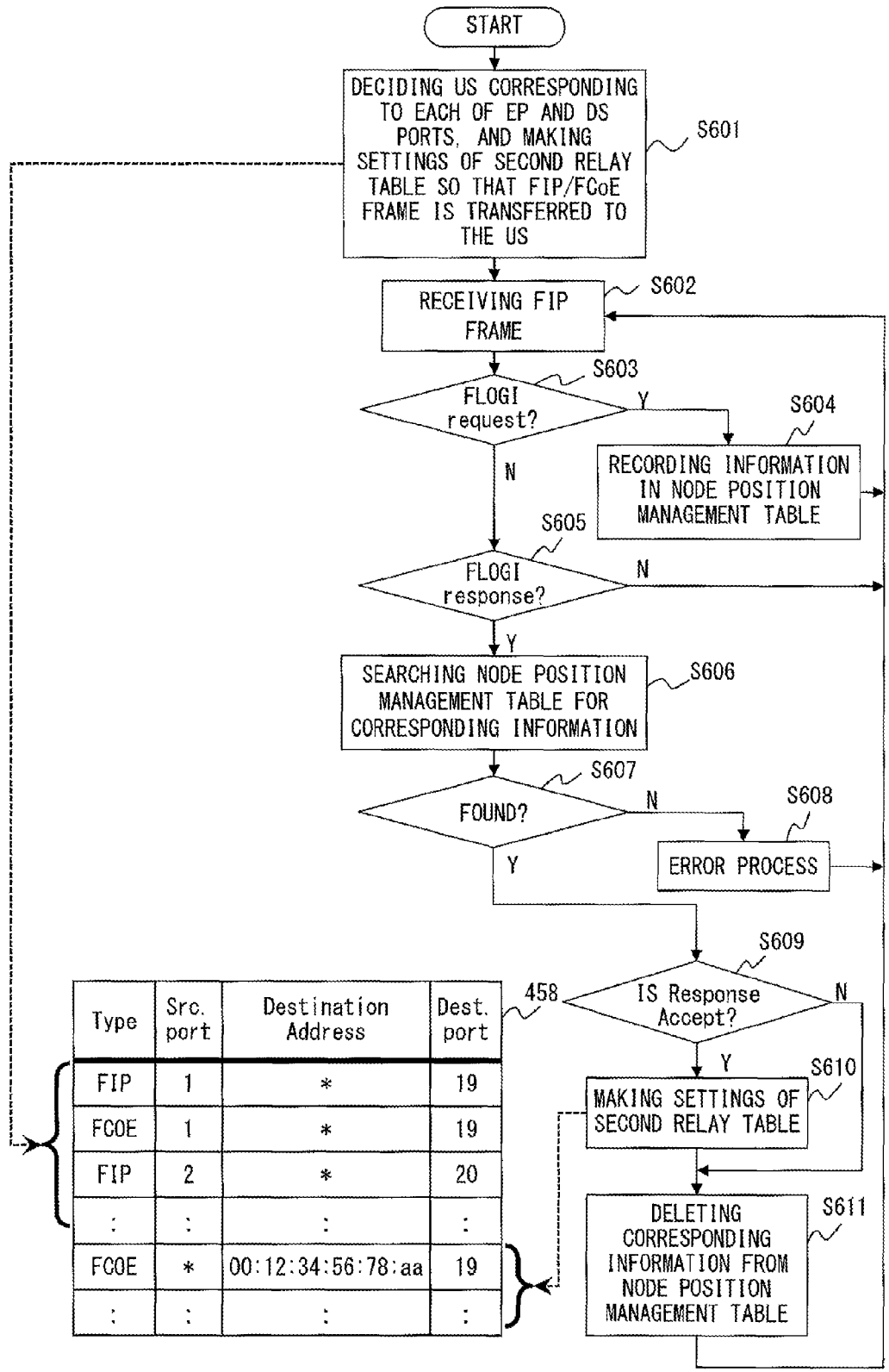
FIG. 13 is a flowchart illustrating a process of a processor according to the embodiment.

FIG. 13 is a flowchart illustrating a process of the processor according to the embodiment.

In step S601, the protocol processing unit 442 decides US corresponding to each of EP and DS, and respectively sets a port number of EP or DS, and a port number of the corresponding US as Source port and Destination port in the second relay table 458. At this time, TYPE in the second relay table 458 is FIP or FCoE, and Destination Address is a wild card. Note that US corresponding to EP or DS is a port connected to the switch device 401 of the same system.

In step S602, the protocol processing unit 442 receives an FIP frame with the process of step S506 illustrated in FIG. 12.

In step S603, the protocol processing unit 442 determines whether the FIP frame is an FLOGI request. When the FIP frame is an FLOGI request, the control proceeds to step S604. Alternatively, when the FIP frame is not an FLOGI request, the control proceeds to step S605.

In step S604, the protocol processing unit 442 makes settings of the node position management table 443 on the basis of the FLOGI request packet.

Figure 14:
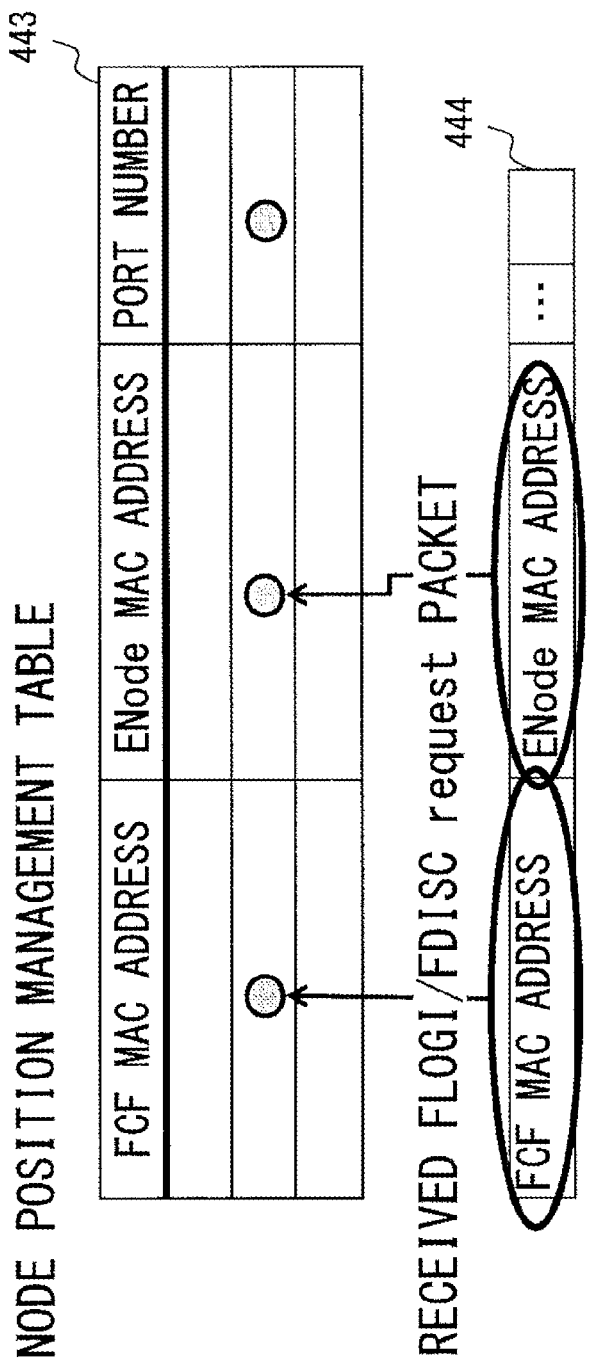
FIG. 14 illustrates settings of the node position management table.

FIG. 14 illustrates settings of the node position management table.

A packet 444 of the FLOGI request includes an FCF MAC address, which is an address of an FCF at a destination, and an ENode MAC address, which is the address of the transmission source.

As illustrated in FIG. 14, the protocol processing unit 442 writes the FCF MAC address and the ENode MAC address of the FLOGI request packet as an FCF MAC address and an ENode MAC address of the node position management table 443. Also, the protocol processing unit 442 writes the port number of the reception port 411 that received the FLOGI request packet as a port number in the node position management table 443.

In step S605, the protocol processing unit 442 determines whether the FIP frame is an FLOGI response. When the FIP frame is an FLOGI response, the control proceeds to step S606. Alternatively, when the FIP frame is not an FLOGI response, the control returns to step S602. Note that an FLOGI response is transmitted from an FCF to an end node.

In step S606, the protocol processing unit 442 searches the node position management table 443 by using, as a search key, a destination address and a transmission source address which are included in the FLOGI response, and checks whether a corresponding code is present.

Figure 15:
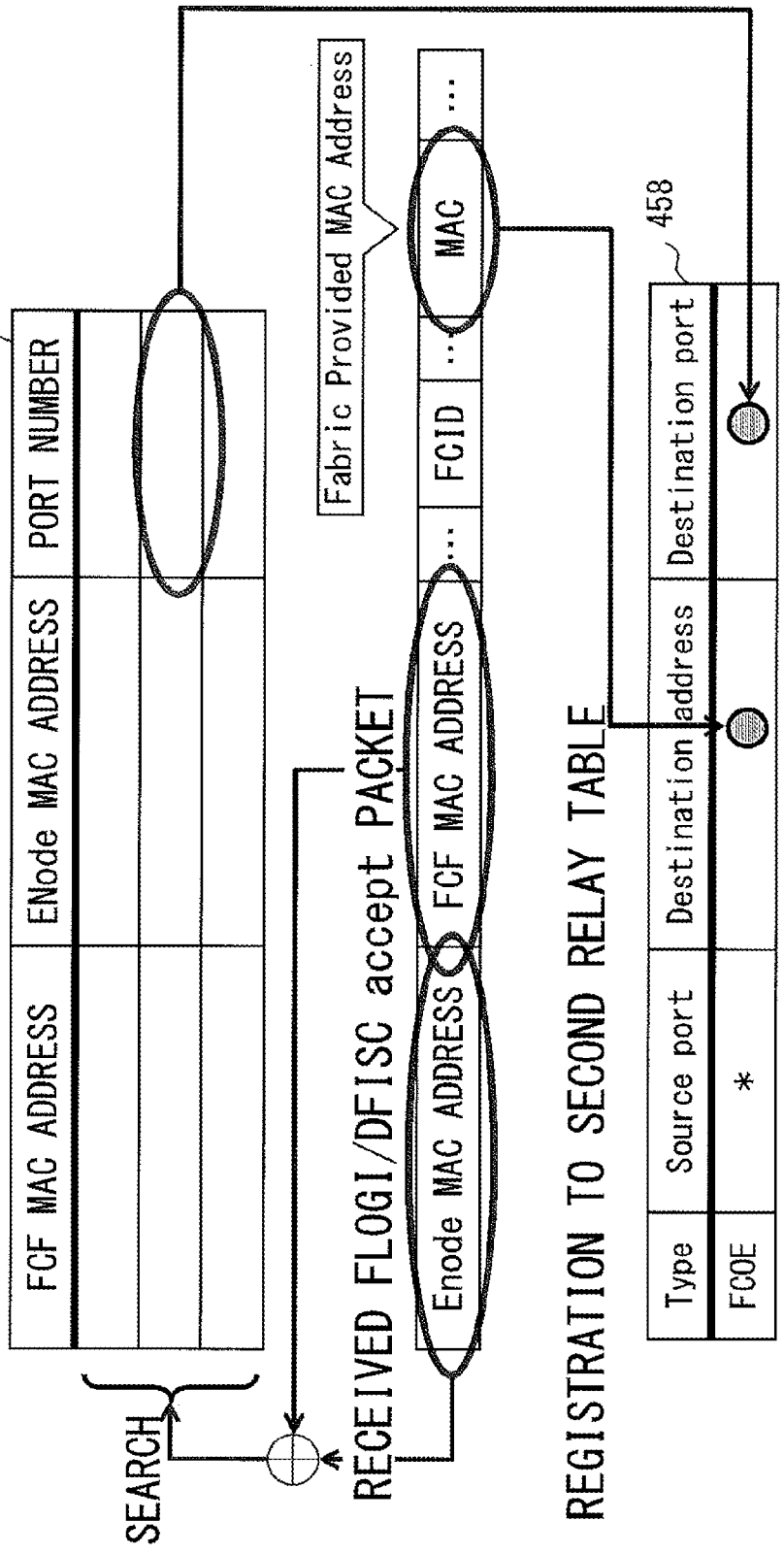
FIG. 15 illustrates a search in the node position management table, and settings of a second relay table.

FIG. 15 illustrates a search in the node position management table, and settings of the second relay table 458.

An FLOGI Accept packet 445 of FLOGI Accept, which is one type of an FLOGI response, includes an Enode MAC address, which is the destination address, and an FCF MAC address, which is the address of the transmission source FCF.

As illustrated in FIG. 15, the protocol processing unit 442 checks whether a record that matches a search key is present in the node position management table 443 by using the Enode MAC address and the FCF MAC address of the FLOGI response packet as the search key.

Returning to FIG. 13, when a record that matches the Enode MAC address and the FCF MAC address of the FLOGI response packet is found in step S607, the control proceeds to step S609. Alternatively, when a record is not found, the control proceeds to step S608.

In step S608, the protocol processing unit 442 executes an error process. The protocol processing unit 442, for example, notifies an administrator of an error, and creates a record of the error.

In step S609, the protocol processing unit 442 determines whether the FLOGI response is Accept. When the FLOGI response is Accept, the control proceeds to step S610. Alternatively, when the FLOGI response is not Accept, the control proceeds to step S611.

In step S610, the protocol processing unit 442 makes settings of the second relay table 458 on the basis of the found record and the FLOGI Accept packet 445.

As illustrated in FIG. 15, the FLOGI Accept packet 445 includes a MAC address that an FCF assigns to an end node. The MAC address is a Fabric Provided MAC address.

Specifically, the protocol processing unit 442 writes the MAC address of the FLOGI Accept packet 445, and the port number of the found record of the node position management table 443 respectively as Destination Address and Destination port in the second relay table 458. At this time, the protocol processing unit 442 sets TYPE and Source port in the second relay table 458 to FCoE and a wild card, respectively.

In step S611, the protocol processing unit 442 deletes the record found in step S607 from the node position management table 443.

How to decide DS, EP and US, and a flow of an Ethernet or FCoE packet when the packet is transmitted are described below.

Figure 16:
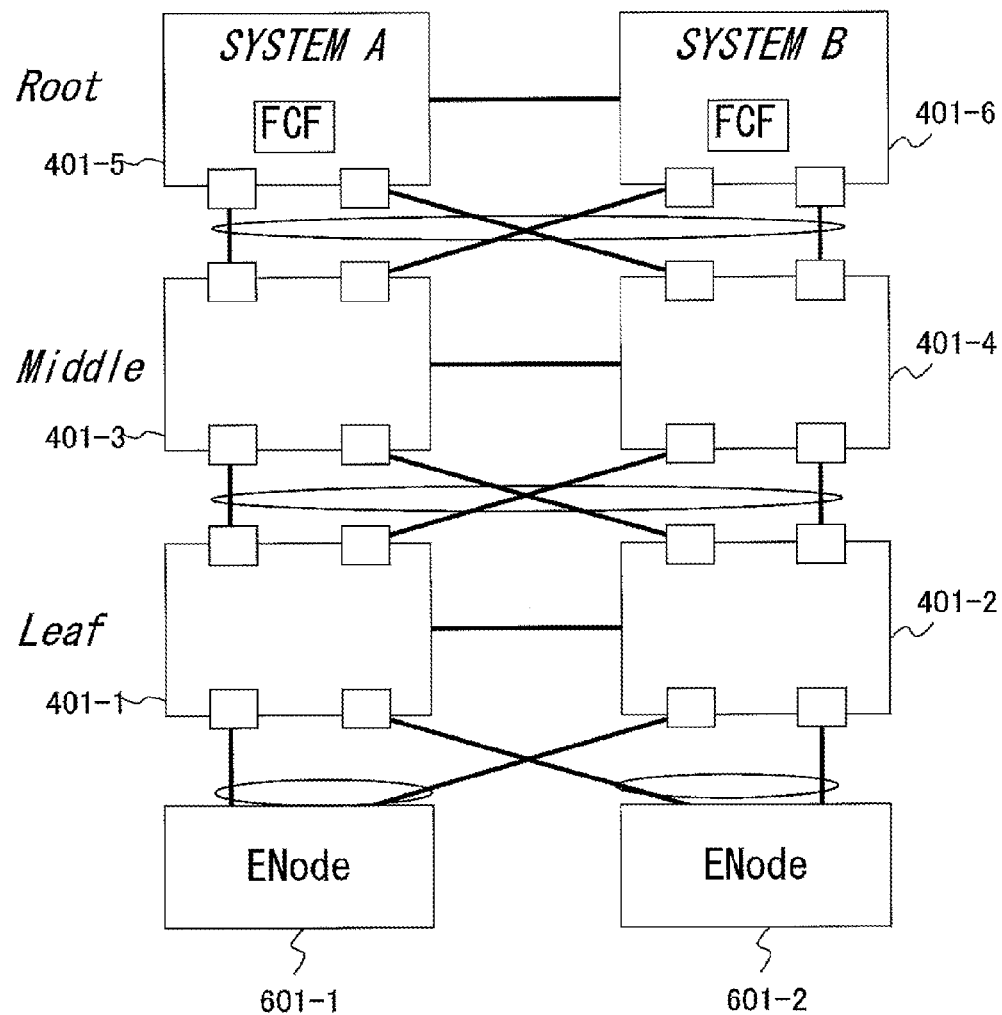
FIG. 16 illustrates a configuration of FCoE according to the embodiment.

FIG. 16 illustrates a configuration of FCoE according to the embodiment.

Figure 1:
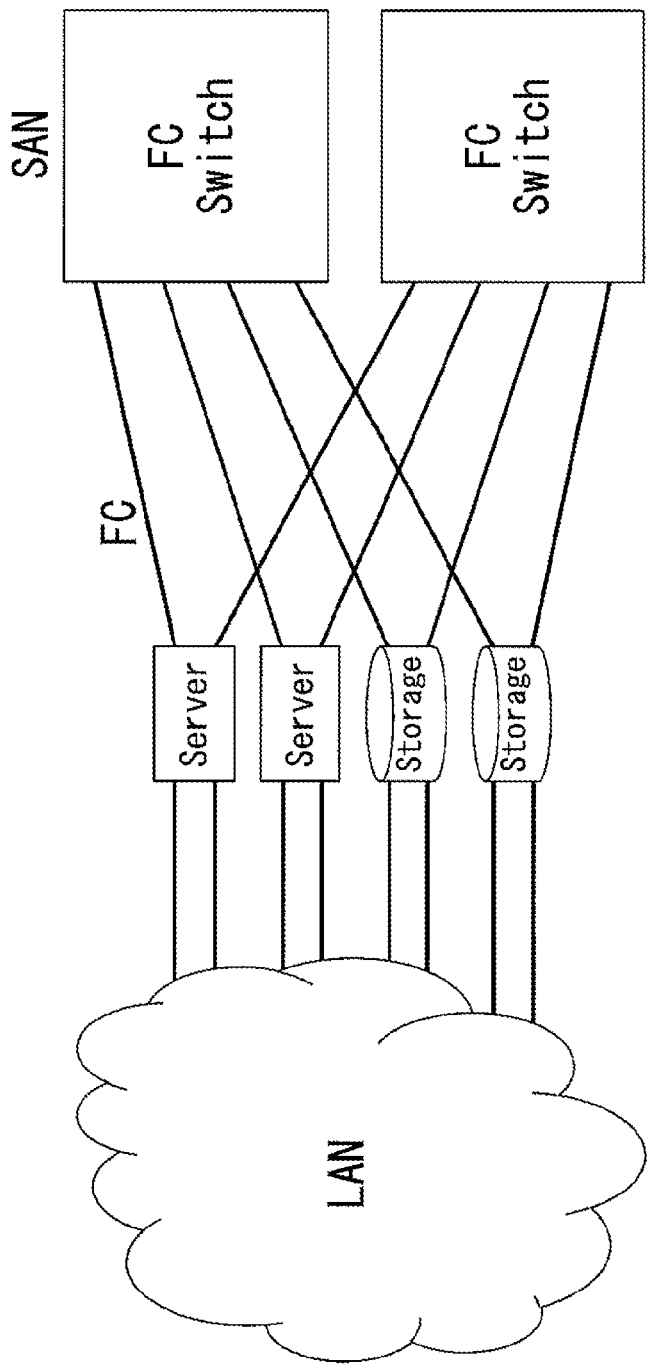
FIG. 1 illustrates a configuration of conventional separated networks.
Figure 2:
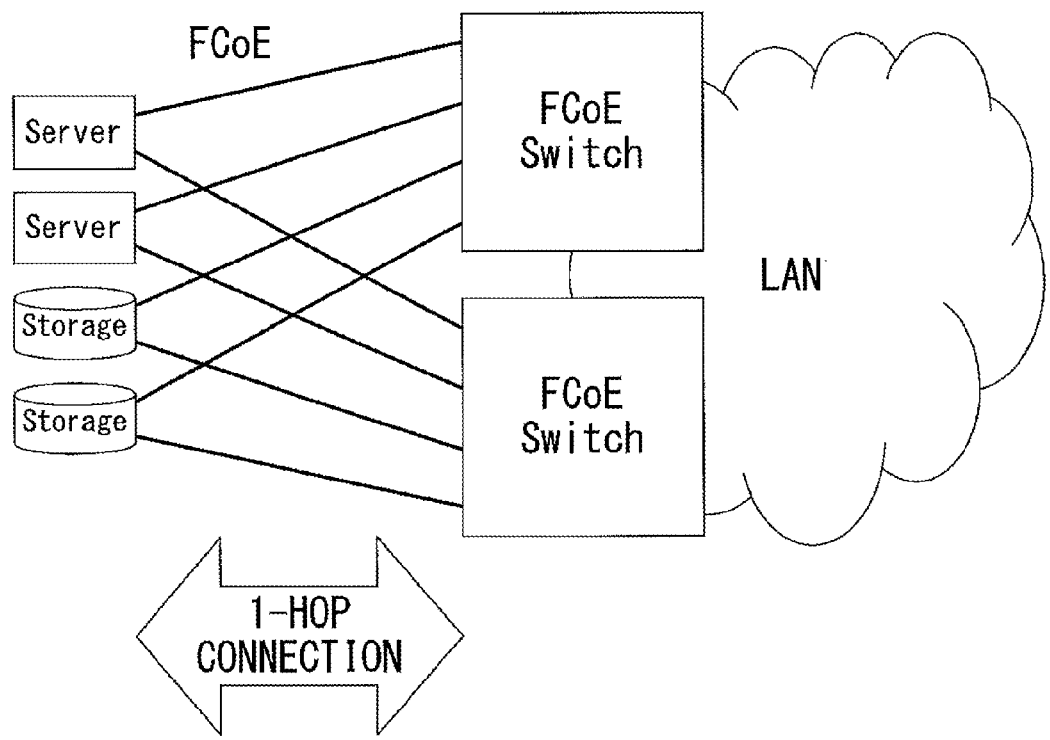
FIG. 2 illustrates an initial configuration of a conventional LAN/SAN integrated network.
Figure 3:
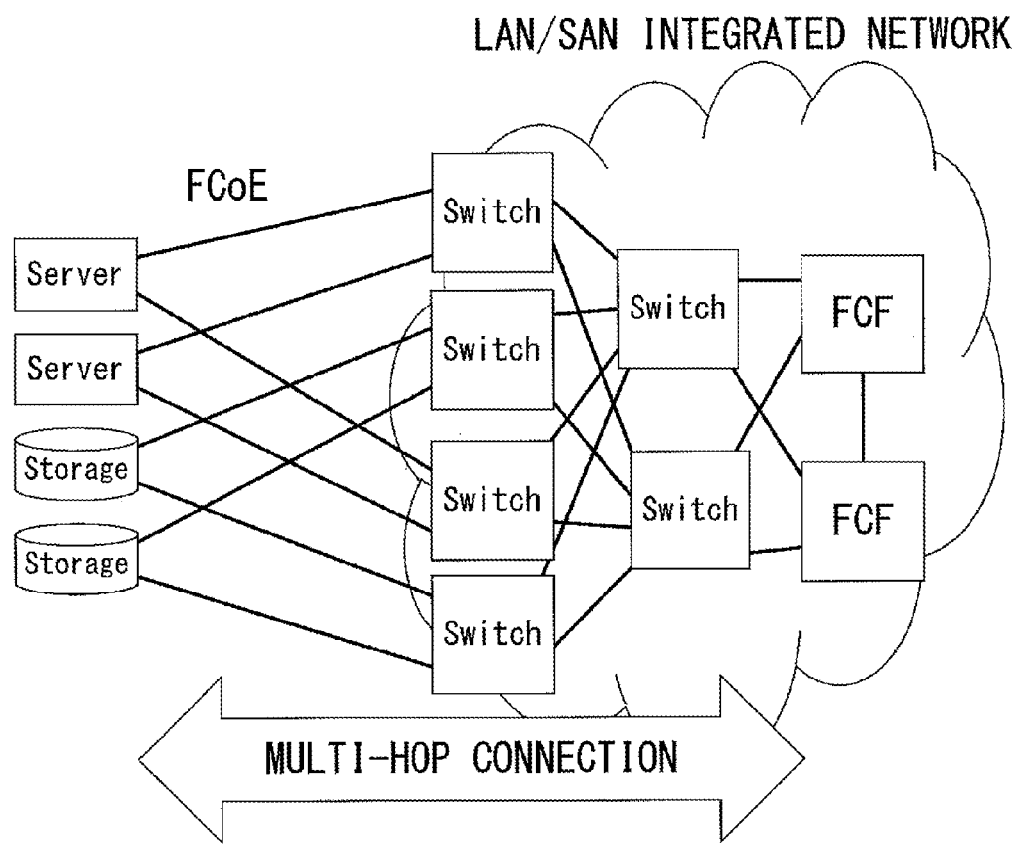
FIG. 3 illustrates a current configuration of a conventional LAN/SAN integrated network.
Figure 4:
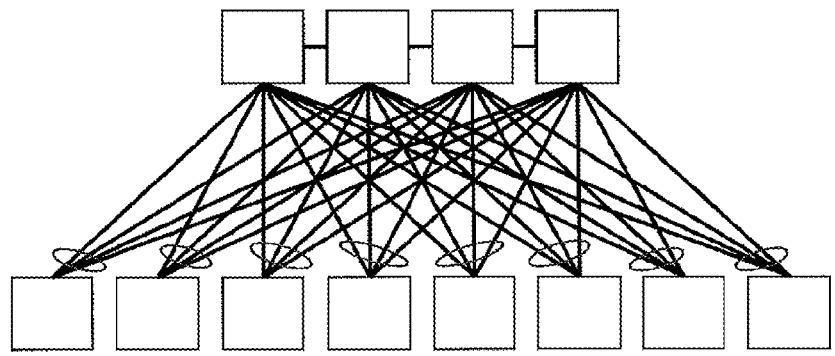
FIG. 4 illustrates a topology (No. 1) having a plurality of path options.
Figure 5:
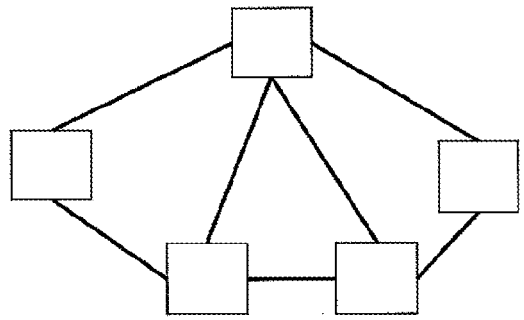
FIG. 5 illustrates a topology (No. 2) having a plurality of path options.
Figure 6:
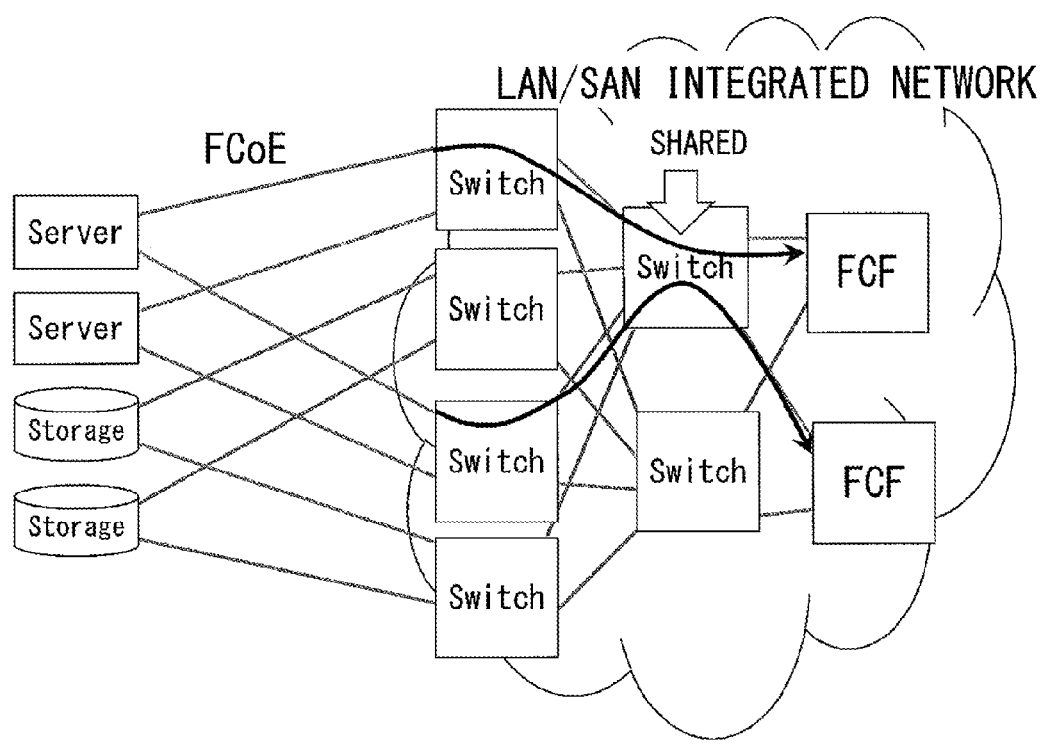
FIG. 6 illustrates sharing of a network in a conventional LAN/SAN integrated network.

In FIG. 16, switch devices 401-j are provided with the same configuration as that illustrated in FIG. 1.

To the switch devices 401-1 and 401-2, end nodes 601-1 and 601-2 are connected.

The end nodes 601 correspond to the servers 201 or the storage devices 301, which are illustrated in FIG. 1

Additionally, in the FCoE illustrated in FIG. 16, MLAG is used for connection between the switch devices 401, and between the switch devices 401-1, 401-2 and the end nodes 601. Each ellipse depicted between links illustrated in FIG. 16 represents MLAG.

The FCFs (the switch devices 401-5, 401-6) are arranged at Root, and the end nodes 601 are arranged in Leaf. The switch devices 401-3, 401-4 are arranged in Middle, whereas the switch devices 401-1, 401-2 are arranged in Leaf.

A port on the left side of the end node 601-1, a port on the left side of the end node 601-2, and the switch devices 401-1, 401-3, 401-5 configure a SAN of a system A, whereas a port on the right side of the end node 601-1, a port on the right side of the end node 601-2, and the switch devices 401-2, 401-4, 401-6 configure a SAN of a system B.

Figure 17:
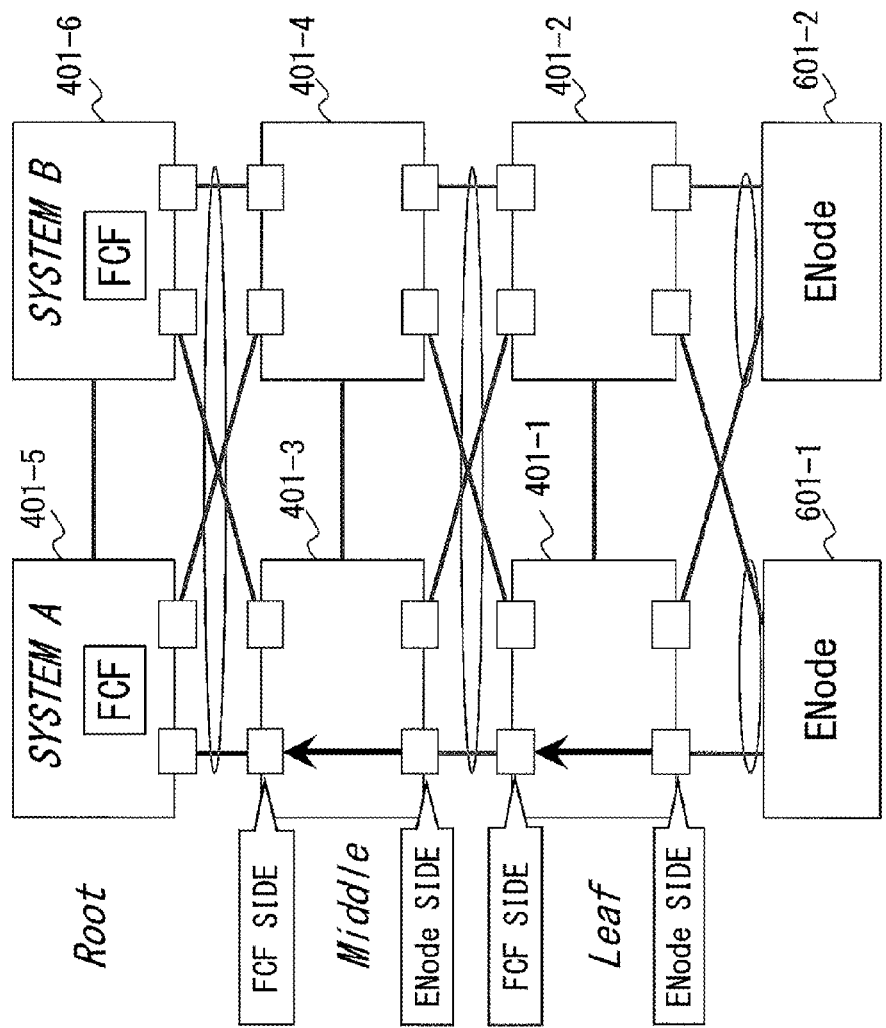
FIG. 17 is an explanatory diagram for deciding a type of a port.

FIG. 17 is an explanatory diagram for deciding a type of a port.

The configuration of the FCoE illustrated in FIG. 17 is the same as that illustrated in FIG. 16.

Here, a port on the FCF side and that on the ENode side are respectively defined as follows. The switch devices 401 decide a type (DS, EP, or US) of a port in the following way.

The port on the FCF side is a port connected to an FCF that belongs to a SAN, to which the local switch device 401 belongs, among ports included in the local switch device 401, or a port connected to a switch device 401 that has a port connected to an FCF belonging to the SAN, to which the local switch device belongs, and belongs to the same SAN.

The type of the port on the FCF side is assumed to be US.

The port on the ENode side is a port connected to the end node 601 among ports included in the local switch device 401, or a port, which is not on the FCF side and connected to a switch device 401 that belongs to the SAN to which the local switch device 401 belongs.

The type of the port connected to the end node 601 among the ports on the ENode side, and that of the port on the Enode side other than EP among the ports on the ENode side are assumed to be EP and DS, respectively.

As described above, the protocol processing unit 442 decides a type of each port of the switch device 401, decides one US corresponding to each of EP and DS as in the aforementioned step S601, and writes an association to the second relay table 458.

As described above, US corresponding to each of EP and DS is decided as in the aforementioned step S601.

FIG. 18 illustrates a flow of an Ethernet packet.

The configuration of the FCoE illustrated in FIG. 18 is the same as that illustrated in FIG. 16.

An Ethernet packet is transmitted by selecting one of links that configure MLAG.

In FIG. 18, an Ethernet packet is output from the switch device 401-5, and arrives at the end node 601-1 via the switch devices 401-4, 401-2.

As described above, the Ethernet packet may possibly be relayed by straddling the switches that respectively configure the system A and the system B.

Note that flows and bandwidths of a LAN and SAN are separated by means of a technique such as Data Center Bridging (DCB) or the like. Accordingly, even if relay methods of a LAN and SAN are different, the LAN and SAN do not interfere with each other.

FIG. 19 illustrates a flow of an FCoE packet from an end node to an FCF.

The configuration of the FCoE illustrated in FIG. 19 is the same as that illustrated in FIG. 16.

FIG. 19 illustrates a case where an FCoE packet is transmitted from the end node 601-1 to the switch device 401-5 in the SAN of the system A, and a case where an FCoE packet is transmitted from the end node 601-2 to the switch device 401-6 in the SAN of the system B.

The FCoE packet output from the end node 601-1 arrives at the switch device 401-5 via the switch devices 401-1, 401-3. The FCoE packet output from the end node 601-2 arrives at the switch device 401-6 via the switch devices 401-2, 401-4.

When the packet is an FCoE packet, the switch devices 401-1 to 401-4 output the FCoE packet from a statistically designated physical port on the basis of the second relay table 458. As a result, the FCoE packet is not relayed to a SAN of a different system.

Figure 20:
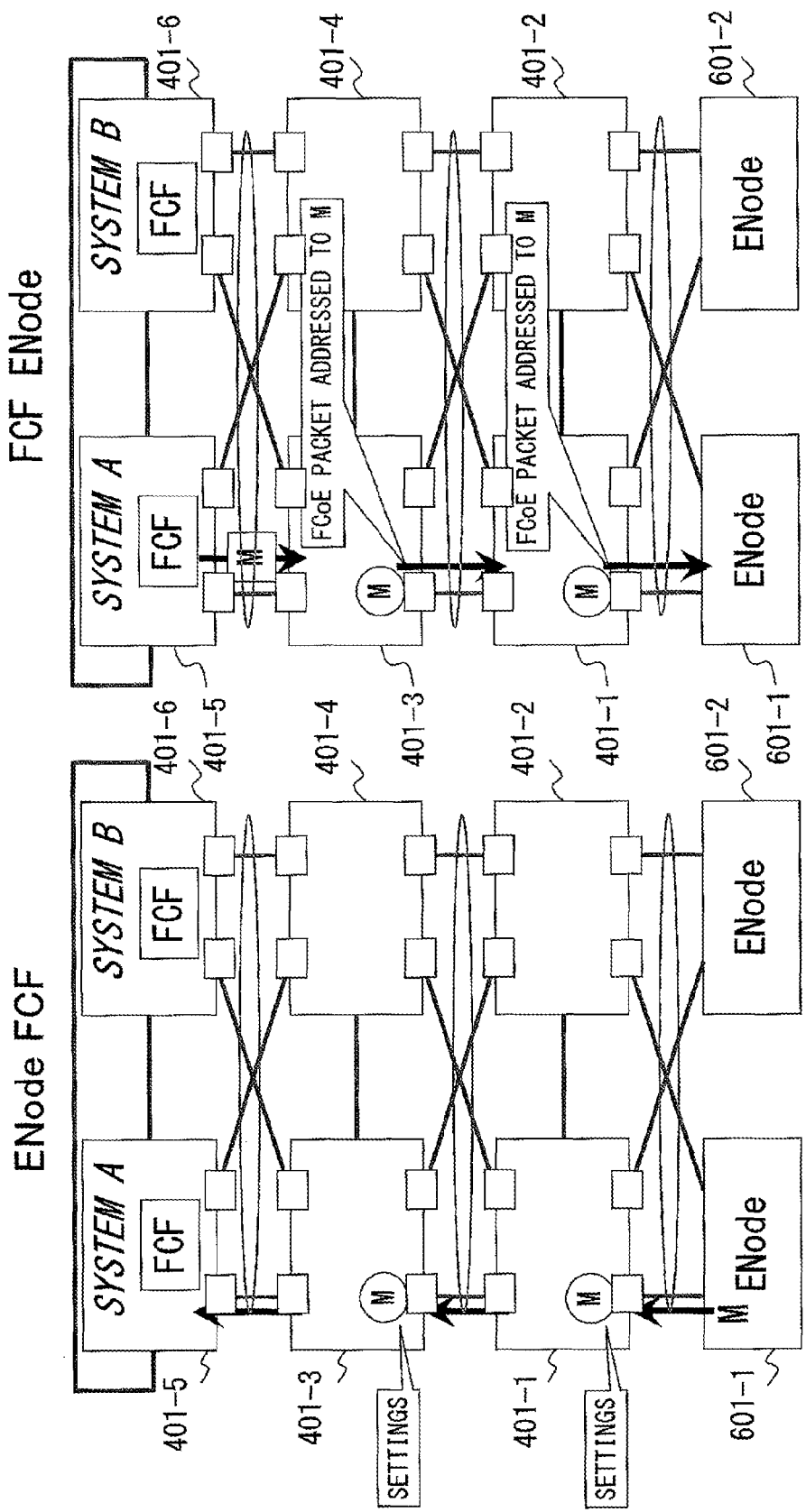
FIG. 20 illustrates settings of switch devices, and a flow of an FCoE packet from an FCF to an end node.

FIG. 20 illustrates settings of the switch devices, and a flow of an FCoE packet from the FCF to the end node.

The configuration of the FCoE illustrated in FIG. 20 is the same as that illustrated in FIG. 16.

The left side of FIG. 20 illustrates the settings of the switch devices 401-3, 401-1.

The switch devices 401-3, 401-1 monitor an FIP frame, obtain a port that has received the FIP frame and an address assigned to the end node 601-1, and associate the port with the address and store them.

Here, a MAC address M is assigned to the end node 601-1. Note that the MAC address is a Fabric Provided MAC Address.

The right side of FIG. 20 illustrates a flow of an FCoE packet from the FCF to the end node.

On the right side of FIG. 20, an FCoE packet is transmitted from the FCF (the switch device 401-5) to the end node 601-1.

The FCoE packet includes the MAC address of the end node 601-1 as a destination address.

The switch devices 401-3, 401-1 reference set information to find a port corresponding to the MAC address of the end node 601-1 at the destination, and output the FCoE packet from the found port.

A case where a multicast FCoE packet is transmitted is described next.

Figure 21:
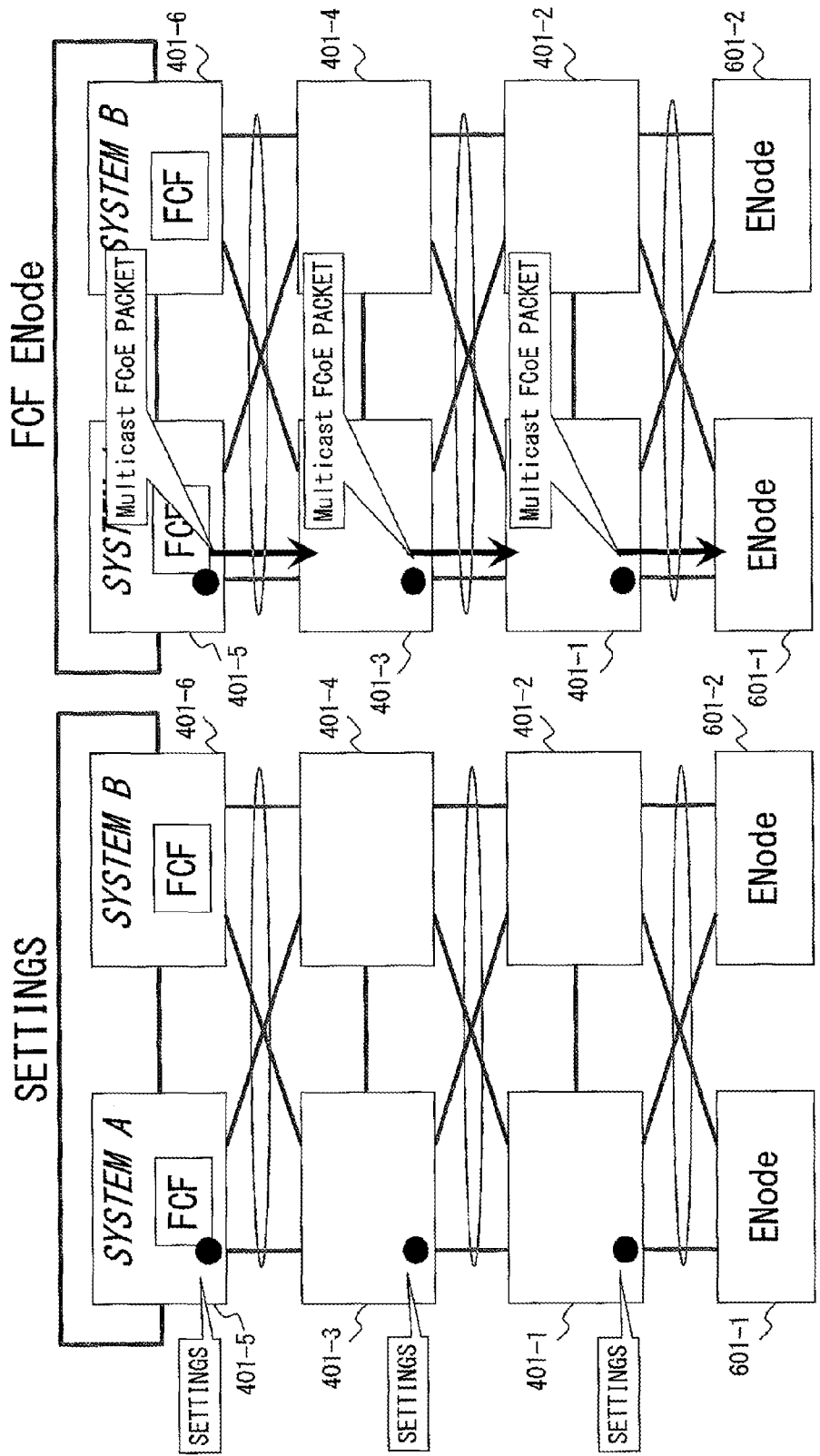
FIG. 21 illustrates settings of switch devices, and transmission of a multicast FCoE packet.

FIG. 21 illustrates settings of switch devices, and transmission of a multicast FCoE packet.

The configuration of the FCoE illustrated in FIG. 21 is the same as that illustrated in FIG. 16.

The left side of FIG. 21 illustrates the settings of the switch devices.

In the switch devices 401-1, 401-3, and 401-5 of the system A, a setting is made in the second relay table 458 such that a multicast FCoE packet is output from a designated port.

The right side of FIG. 21 illustrates transmission of the multicast FCoE packet.

On the right side of FIG. 21, the multicast FCoE packet is transmitted from the FCF (the switch device 401-5) to the end node 601-1.

The second relay processing unit 457 of each of the switch devices 401-1, 401-3, 401-5 outputs the multicast FCoE packet from the designated port on the basis of the second relay table 458.

FIG. 22 illustrates a multicast address.

The upper part of FIG. 22 represents a MAC address in the case of multicasting.

In the case of multicasting, the lowest-order bit of the first octet of the MAC address is set to 1.

The lower part of FIG. 22 represents a MAC address in the case of IP multicasting.

In the case of IP multicasting, the higher-order three octets of the MAC address are set to 01-00-5E, and the lower-order 23 bits are assigned to a multicast group.

Figure 23:
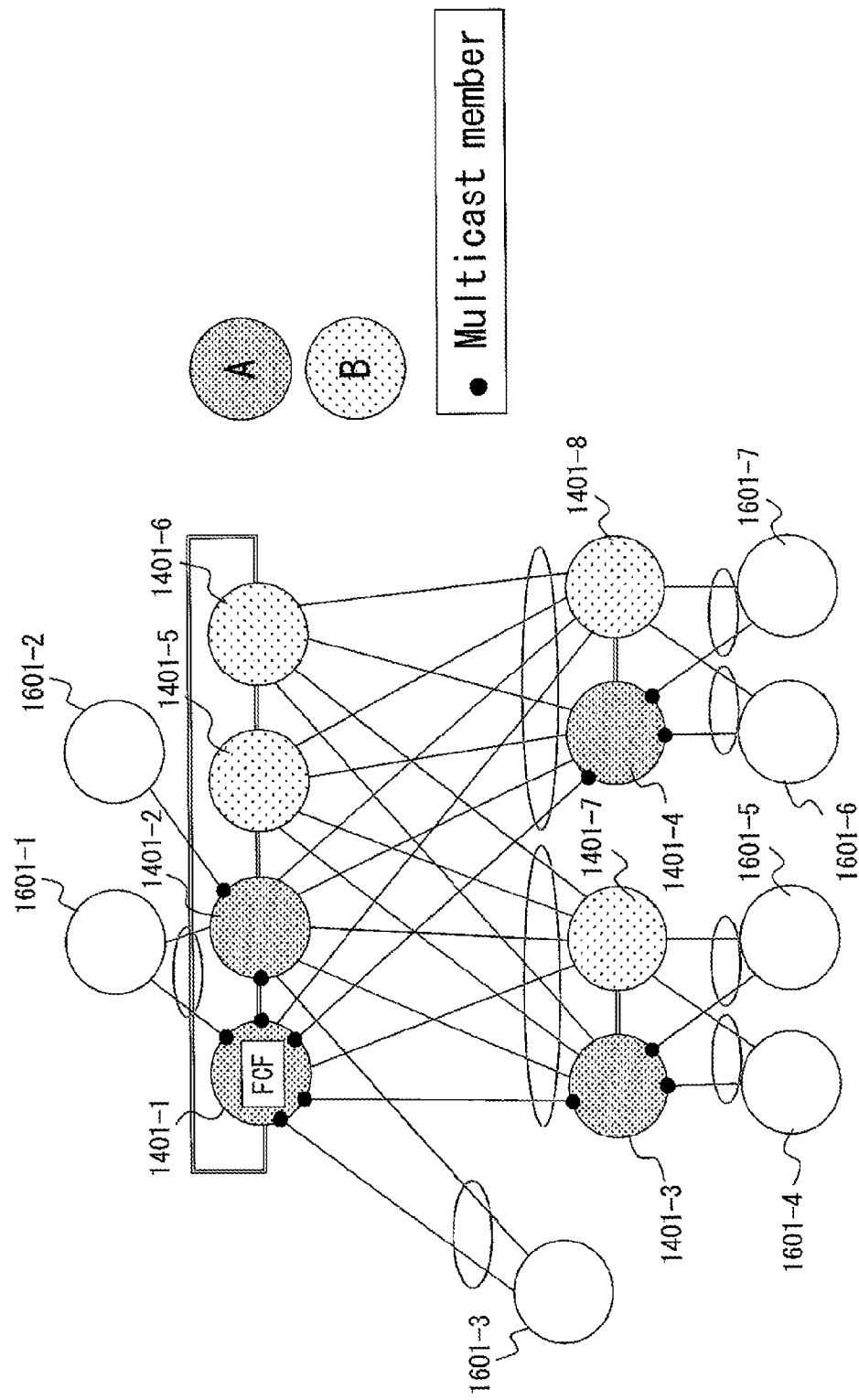
FIG. 23 illustrates a configuration of an FCoE according to another embodiment.

FIG. 23 illustrates a configuration of an FCoE according to another embodiment.

The system illustrated in FIG. 23 includes switch devices 1401-1 to 1401-8, and end nodes 1601-1 to 1601-7.

The switch devices 1401-1 to 1401-4 and ports on the left side of the end nodes 1601 to 1601-7 configure a SAN of the system A, whereas the switch devices 1401-5 to 1401-8 and ports on the right side of the end nodes 1601-1 to 1601-7 configure a SAN of the system B.

Also, the switch device 1401-1 is an FCF of the system A. An FCF of the system B is omitted in FIG. 23.

In a system that performs multicasting, the shortest path using an FCF as a route is obtained to make a setting for performing multicasting in the case of the SAN of the system A. Moreover, path information is set in each of the switch devices 1401.

In FIG. 23, each black circle at an endpoint of a link indicates a link to or from which a multicast packet is transmitted or received when a packet is transmitted from the FCF.

Figure 24:
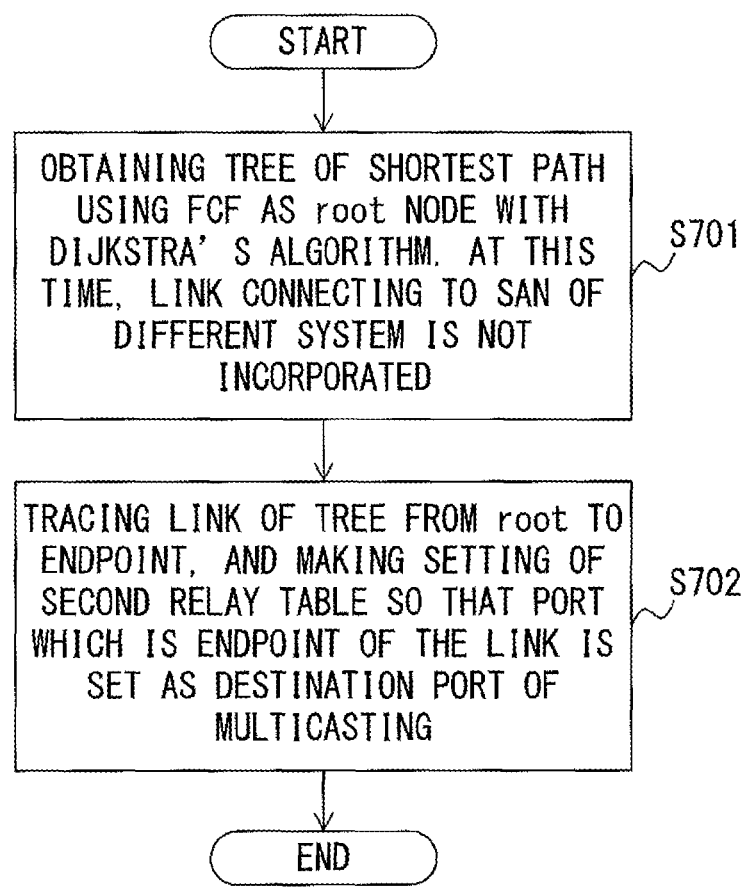
FIG. 24 is a flowchart illustrating a process of setting a multicast path.

FIG. 24 is a flowchart illustrating a process of setting a multicast path.

In step S701, the protocol processing unit 442 obtains a tree of the shortest path using an FCF as a root node with Dijkstra's algorithm. At this time, the protocol processing unit 442 does not incorporate a link connected to a SAN of a different system when the tree of the shortest path is calculated.

In step S702, the protocol processing unit 442 traces the link of the tree from the root to the endpoint, and makes a setting for the second relay table 458 such that a port at which the link is originated is set as a destination port of multicasting.

Figure 25:
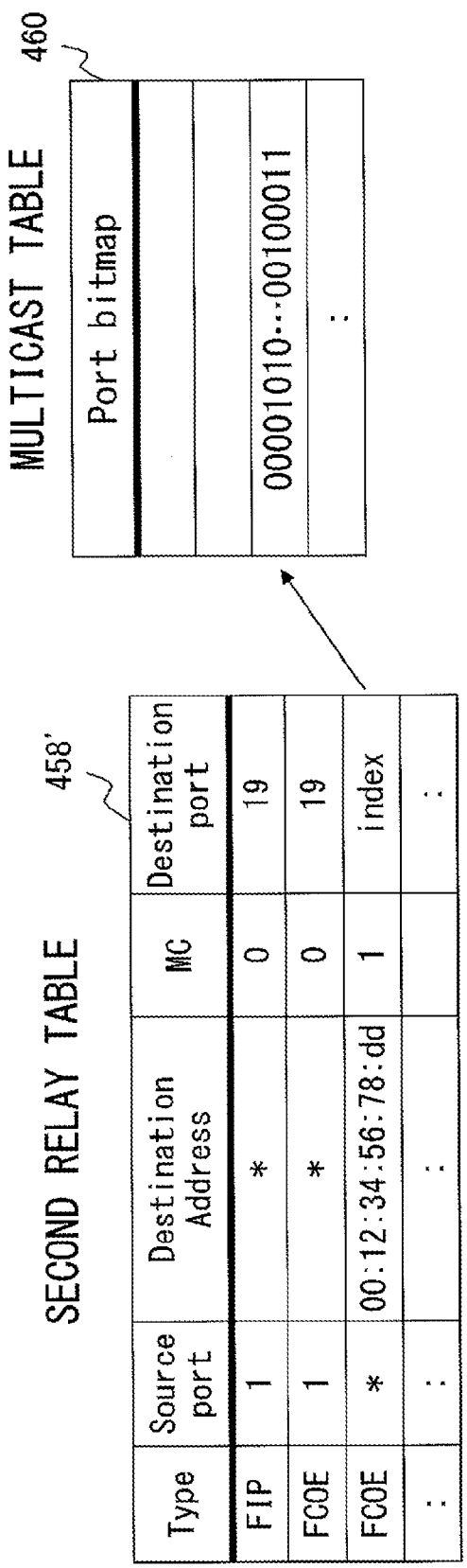
FIG. 25 illustrates examples of a second relay table and a multicast table.

FIG. 25 illustrates examples of the second relay table and a multicast table.

When multicasting is utilized, the switch device 401 uses a second relay table 458' and a multicast table 460.

In the second relay table 458', Type, Source port, Destination Address, and Destination port are associated with one another and written.

The Type, the Source port, the Destination Address, and the Destination port are the same as those of the second relay table 458 illustrated in FIG. 11.

MC is a value that indicates whether multicasting is used. When MC is 1, it indicates that multicasting is performed.

Additionally, an index to the multicast table 460 is stored as the Destination port corresponding to MC=1.

In the multicast table 460, a port bitmap indicating a number of a port that outputs a multicast packet is written. In the port bitmap, a bit number and a port number are associated with each other.

The second relay processing unit 457 decides a port corresponding to a bit number set to 1 in a port bitmap as a port that outputs a multicast packet. Then, the second relay processing unit 457 outputs, to the demultiplexer 459, a control signal for selecting the decided transmission port 421. The demultiplexer 459 outputs the packet from the decided transmission port 421 on the basis of the control signal.

With the switch device according to the embodiments, a communication of a first system does not exert an influence on that of a second system, and thus communication performance is stabilized.

Additionally, with the switch device according to the embodiments, communications of the first system and the second system do not share a network, enabling bandwidths to be secured.

All examples and conditional language provided herein are intended for pedagogical purposes of aiding the reader in understanding the invention and the concepts contributed by the inventor to further the art, and are not to be construed as being limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A switch device including a plurality of ports, the switch device comprising:
    a determination circuit configured to determine whether a received frame is either a first communication or a second communication;
    a first relay circuit configured to decide a transmission port to which the frame of the first communication is output, among the plurality of ports, on the basis of content of a first relay table when the determination circuit determines that the received frame is the first communication;
    a processor configured to decide a transmission port corresponding to a destination address of the received frame among the plurality of ports, and to decide an upstream port corresponding to each of an end port and a downstream port among the plurality of ports, and to generate a second relay table including information for identifying the transmission port corresponding to the destination address of the received frame, and information for identifying the upstream port corresponding to the end port or the downstream port; and
    a second relay circuit configured to decide, as a transmission port to which the frame of the second communication is output, the upstream port corresponding to the end port or the downstream port among the plurality of ports on the basis of the content of the second relay table when the port that has received the frame of the second communication is the end port or the downstream port, or to decide, as the transmission port to which the frame of the second communication is output, a transmission port corresponding to the destination address of the received frame among the plurality of ports on the basis of the content of the second relay table when the port that has received the frame of the second communication is neither the end port nor the downstream port, in the case where the received frame is the frame of the second communication.

2. The switch device according to claim 1, wherein the upstream port corresponding to the end port or the downstream port is a port connected to a different switch device belonging to a same Storage Area Network (SAN) as a SAN to which a local switch device belongs.

3. The switch device according to claim 1, wherein the first communication is a communication of Ethernet, and the second communication is a communication of Fibre Channel over Ethernet (FCoE).

4. A network system where a plurality of switch devices are connected, wherein each of the plurality of switch devices comprises:
    a plurality of ports;
    a determination circuit configured to determine whether a received frame is either a first communication or a second communication;
    a first relay circuit configured to decide a transmission port to which the frame of the first communication is output, among the plurality of ports, on the basis of content of a first relay table when the determination circuit determines that the received frame is the first communication;
    a processor configured to decide a transmission port corresponding to a destination address of the received frame among the plurality of ports, and to decide an upstream port corresponding to each of an end port and a downstream port among the plurality of ports, and to generate a second relay table including information for identifying the transmission port corresponding to the destination address of the received frame, and information for identifying the upstream port corresponding to the end port or the downstream port; and
    a second relay circuit configured to decide, as a transmission port to which the frame of the second communication is output, the upstream port corresponding to the end port or the downstream port among the plurality of ports on the basis of the content of the second relay table when the port that has received the frame of the second communication is the end port or the downstream port, or to decide, as the transmission port to which the frame of the second communication is output, a transmission port corresponding to the destination address of the received frame among the plurality of ports on the basis of the content of the second relay table when the port that has received the frame of the second communication is neither the end port nor the downstream port, in the case where the received frame is the frame of the second communication.

5. The network system according to claim 4, wherein the upstream port corresponding to the end port or the downstream port is a port connected to a different switch device belonging to a same Storage Area Network (SAN) as a SAN to which a local switch device belongs.

6. The network system according to claim 4, wherein the first communication is a communication of Ethernet, and the second communication is a communication of Fibre Channel over Ethernet (FCoE).

7. A control method for a switch device including a plurality of ports, the method comprising:
    determining whether a received frame is either a first communication or a second communication;
    deciding a transmission port, to which the frame of the first communication is output, among the plurality of ports on the basis of content of a first relay table when it is determined that the received frame is the first communication;

deciding a transmission port corresponding to a destination address of the received frame;

deciding an upstream port corresponding to each of an end port and a downstream port among the plurality of ports;

generating a second relay table including information for identifying the transmission port corresponding to the destination address of the received frame, and information for identifying the upstream port corresponding to the end port or the downstream port; and deciding, as a transmission port to which the frame of the second communication is output, the upstream port corresponding to the end port or the downstream port among the plurality of ports on the basis of the content of the second relay table when the port that has received the frame of the second communication is the end port or the downstream port, or deciding, as the transmission port to which the frame of the second communication is output, a transmission port corresponding to the destination address of the received frame among the plurality of ports on the basis of the content of the second relay table when the port that has received the frame of the second communication is neither the end port nor the downstream port.

8. The control method according to claim 7, wherein the upstream port corresponding to the end port or the downstream port is a port connected to a different switch device belonging to a same Storage Area Network (SAN) as a SAN to which a local switch device belongs.

9. The control method according to claim 7, wherein the first communication is a communication of Ethernet, and the second communication is a communication of Fibre Channel over Ethernet (FCoE).

* * * * *